US008036380B2

(12) United States Patent
Gehrmann et al.

(10) Patent No.: US 8,036,380 B2
(45) Date of Patent: Oct. 11, 2011

(54) EFFICIENT DATA INTEGRITY PROTECTION

(75) Inventors: Christian Gehrmann, Lund (SE);
Bernard Smeets, Dalby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1146 days.

(21) Appl. No.: 11/611,128

(22) Filed: Dec. 14, 2006

(65) Prior Publication Data

US 2008/0144819 A1    Jun. 19, 2008

(51) Int. Cl.
*H04L 9/00* (2006.01)
*H04L 9/32* (2006.01)
*G06F 7/04* (2006.01)
*G06F 7/58* (2006.01)

(52) U.S. Cl. ............ 380/46; 380/44; 380/265; 713/168; 726/2; 708/252

(58) Field of Classification Search ............ 380/42, 380/44, 46, 47, 259, 260, 262, 264, 265; 713/168, 171, 190; 714/758, 799, 801; 726/2, 726/5, 6, 18; 708/252
See application file for complete search history.

(56) References Cited

U.S. PATENT DOCUMENTS

| | | | |
|---|---|---|---|
| 4,797,922 A | | 1/1989 | Massey et al. |
| 5,051,999 A | * | 9/1991 | Erhart et al. .................. 714/774 |
| 5,206,824 A | * | 4/1993 | Arazi ............................ 708/492 |
| 5,345,507 A | | 9/1994 | Herzberg et al. |
| 5,351,301 A | | 9/1994 | Benincasa |
| 5,642,367 A | * | 6/1997 | Kao ............................... 714/784 |
| 6,463,448 B1 | | 10/2002 | Mo |
| 6,785,389 B1 | * | 8/2004 | Sella et al. ..................... 380/46 |
| 6,963,976 B1 | * | 11/2005 | Jutla .............................. 713/181 |
| 7,003,713 B2 | | 2/2006 | Rodgers |
| 7,502,814 B2 | * | 3/2009 | Dirscherl et al. ............. 708/250 |
| 2001/0021253 A1 | | 9/2001 | Furuya et al. |
| 2003/0154436 A1 | * | 8/2003 | Parhi ............................ 714/758 |
| 2004/0107233 A1 | | 6/2004 | Kim et al. |

(Continued)

FOREIGN PATENT DOCUMENTS

EP    0 624 839 A1    11/1994

(Continued)

OTHER PUBLICATIONS

Menezes, J., Van Oorschot, P. C. and Vanstone, S.A., *Handbook of Applied Cryptography*, Chapter 9.4, pp. 338-351 (1997).

(Continued)

*Primary Examiner* — Eleni Shiferaw
*Assistant Examiner* — Hilary Branske
(74) *Attorney, Agent, or Firm* — Potomac Patent Group PLLC

(57) ABSTRACT

A message authentication code, MAC, is generated in an electronic circuit, wherein the MAC integrity protects a data value, PD. A random challenge word, RND, is received from a source that is external to the electronic circuit. A first function G(RND,K) is evaluated that generates a first encrypted value, K', from RND and K, wherein K is a secret key value that is stored on the electronic circuit. A second function F(RND,K) is evaluated that generates a second encrypted value, K″, from RND and K. The MAC is then generated in accordance with $$MAC = K'' + m_1 K' + m_2 K'^2 + \ldots + M_l K'^l,$$

wherein $m_1, m_2, \ldots, m_l$ are derived by representing the data value, PD, as an l-tuple of elements in a field, $GF(2^n)$, wherein n is an integer greater than zero. A hardware-efficient arrangement is also disclosed for generating this and other MACs.

22 Claims, 10 Drawing Sheets

U.S. PATENT DOCUMENTS

| | | | | |
|---|---|---|---|---|
| 2004/0117686 A1* | 6/2004 | Vainsencher et al. | ............ | 714/13 |
| 2005/0066168 A1 | 3/2005 | Walmsley | | |
| 2006/0285684 A1* | 12/2006 | Rogaway | ......................... | 380/37 |
| 2007/0047623 A1* | 3/2007 | Eun et al. | ...................... | 375/130 |
| 2007/0067374 A1* | 3/2007 | Iketani et al. | ................. | 708/250 |

FOREIGN PATENT DOCUMENTS

| | | |
|---|---|---|
| EP | 1 398 904 A1 | 3/2004 |
| WO | 01/50676 A2 | 7/2001 |

OTHER PUBLICATIONS

"HMAC Keyed-Hashing for Message Authentication," IEFT RFC 2104.

Kabatanskii, G., Smeets, B. and Johansson T., "On the cardinality of systematic authentication codes via error-correcting codes", *IEEE Transaction on Information Theory*. vol. 42. No. 2. 1996.

Gehrmann, J. and Smeets, B., *Bluetooth Security*, pp. 74-80, Artech House, 2004.

McEliece, R. J., *Finite Fields for Computer Scientists and Engineers*, pp. 97-118, Kluwer, 1987.

McLoone, M. and McCanny, J. V., "Efficient Single-Chip Implementation of SHA-384 & SHA-512", IEEE, 2002.

Huang, A. L. and Penzhorn, W. T., "Cryptographic Hash Functions and Low-Power Techniques for Embedded Hardware", IEEE, 2005.

PCT International Search Report, mailed Jul. 29, 2008, in connection with International Application No. PCT/EP2007/063712.

PCT Written Opinion, mailed Jul. 29, 2008, in connection with International Application No. PCT/EP2007/063712.

Schneier, B. "Applied Cryptography, Passage" Applied Cryptography. Protocols, Algorithms, and Source Code in C, New York, John Wiley & Sons, US, 1996, pp. 372-388, 459, XP002443776, ISBN: 0-471-11709-9.

\* cited by examiner

EFFICIENT DATA INTEGRITY PROTECTION

BACKGROUND

The present invention relates to providing integrity protection for data in an efficient manner.

For many types of programmable electronic equipment, there is a need to protect the equipment from illegal reprogramming. This is the case, for example, with mobile communications equipment (e.g., cellular telecommunications equipment), in which there is a need not only to ensure that only type approved software is running on the equipment, but also to provide secure locking mechanisms for sensitive information stored in the equipment (e.g., a secure Subscriber Information Module (SIM) Lock mechanism). One important ingredient in a system solution for protection against unauthorized reprogramming is the use of One Time Programmable (OTP) memory. As its name expresses, OTP memory is a type of memory device that permits a single recording of information into a memory area. OTP memories are nonvolatile (i.e., they retain their information even when powered off). Initially, an OTP is in an unprogrammed state. Then, there is a programming phase in which the memory bits are programmed (e.g., one by one or as an entire block in a single operation, the particular implementation being irrelevant to this discussion). Following the recording of the information (hereinafter referred to as "OTP data"), the OTP memory is locked by any one of several techniques that prevents any information from being written in that portion of memory. Often, the information cannot be erased once the OTP enters its "locked" state. In some implementations, erasing is permitted but only when applied to the entire block of memory bits; erasing cannot be selectively applied to individual memory locations.

OTP memory is useful in many types of applications. As just one of many possible examples, before mobile equipment is customized, it must be possible to store the equipment software into a nonvolatile memory (e.g., a flash memory device). Hence, there exists a vulnerable "virgin state" that allows new software and parameters to be programmed into the equipment. It is, therefore, important to make sure that once the equipment has left the factory, it is not be possible to bring the equipment back to this "virgin" state in any uncontrolled manner as this would allow illegal reprogramming. An OTP memory is very useful for this purpose because its contents can be used to hold information that distinguishes equipment that has left the factory from equipment that has not. One can, for example, set a so-called production flag in the OTP memory once the equipment's customization is finalized. This flag then informs the equipment boot and loader software that the equipment is customized and that any reprogramming needs special authorization.

The software utilizing the OTP information is typically executed on the main processor of the equipment (e.g., the main baseband processor of mobile communication equipment e.g., a mobile phone). This implies that the most secure OTP-based solution is a solution in which the OTP memory resides on the same integrated circuit—"chip"—(e.g., a baseband processor in a mobile phone) as the main processor, since this will make tampering of the OTP read functionality much more difficult. Unfortunately, it is not always possible to offer on-chip OTP memory due to a number of technical and cost limitations. Consequently the OTP memory must often be realized in an external hardware component. In such an arrangement, there is of necessity a communications link for conveying the OTP readout from the external hardware component to the main processor. This communications link exposes the OTP reading function to manipulations of the data transfer between the OTP memory and the baseband chip. Manipulated data can cause the equipment to appear to be back in its "virgin" state, and therefore susceptible to unauthorized reprogramming.

The situation described thus far with respect to OTP memory is but one example of the more general problem that arises when data stored on a peripheral device (henceforth referred to as "peripheral data" or "PD") is exposed to unauthorized manipulation when read by a "main" processor.

This threat can be considerably reduced by protecting the PD read operations by cryptographic means. More specifically, the main processor can determine whether the data that it receives from the communications link between itself and the peripheral memory (e.g., OTP memory) is authentic by issuing a random (or pseudorandom) challenge word (RND) to the external hardware component at or about the time that it initiates a read operation from the peripheral memory. The external hardware component reads the data from the peripheral memory and uses an encryption procedure to derive a "Message Authentication Code" (MAC) from the peripheral data, a previously stored secret key (K), and the random challenge word (RND). The generated MAC is then returned to the main processor along with the peripheral data. The main processor, which also maintains a copy of the secret key K, uses the secret key K, the received peripheral data, and the issued random challenge word (RND) to calculate a reference MAC' value. If MAC' equals the received MAC value, then the received peripheral data is regarded as valid (i.e., it has not been tampered with).

The most common way to construct a MAC for this and other purposes is to base it on so-called one-way hash functions, such as SHA-1 and MD5. The interested reader can refer to J. Menezes, P. C. van Oorschot and S. A. Vanstone, *Handbook of Applied Cryptography*, Chapter 9.4, pp. 338-351 (1997) for more details. One of the most widely used MAC functions is the HMAC function that actually is based on a one-way hash function. The interested reader can refer to "HMAC Keyed-Hashing for Message Authentication," IETF RFC 2104.

If a MAC is to be generated in a peripheral unit, for example for the purpose of providing a mechanism for protecting the integrity of data supplied by that peripheral unit (e.g., the OTP data discussed above), it is desirable that the MAC calculation hardware be implemented using the smallest possible components. Unfortunately, a MAC implementation based on a one-way hash function or a block cipher is rather complex, and therefore does not satisfy this criterion. For example, an optimized SHA-1 hardware implementation alone typically has a size of around 14K gates.

It is therefore desirable to provide high security data integrity apparatuses and methods that can be implemented in a component-efficient manner.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in embodiments encompassing methods and/or apparatuses for generating an authentication code. This involves, in an apparatus comprising linear feedback shift register (LFSR) circuitry and additional circuitry connected to the LFSR, the LFSR comprising a shift register and feedback circuitry, causing the LFSR circuitry and the additional circuitry to function together as a key generator in a first mode of operation; and in a second mode of operation, causing the LFSR circuitry and the additional circuitry to function together as a multiplier.

In another aspect, the method is performed in an electronic circuit, and involves receiving a random challenge word, RND, from a source that is external to the electronic circuit. A first value is generated by performing a logical operation between at least a portion of the random challenge word, RND, and at least a portion of a secret key value, K, wherein K is stored on the electronic circuit. A second value is generated by performing a logical operation between at least another portion of the random challenge word, RND, and at least another portion of the secret key value, K. The LFSR circuitry is caused to generate a first pseudorandom value from the first value, and the additional circuitry is caused to be utilized as a second linear feedback shift register that generates a second pseudorandom value from the second value. A first key value, K', is generated from the first pseudorandom value and the second pseudorandom value by causing the LFSR circuitry and the additional circuitry to function together as the key generator.

In still another aspect, the LFSR circuitry and additional circuitry are caused to concurrently generate a series of terms $K^{i+1}$ and $$(m_1 K'+m_2 K'^2+\ldots+m_l K'^l), 1 \leq i \leq l,$$

wherein $m_1, m_2, \ldots, m_l$ are derived by representing peripheral data, PD, as an l-tuple of elements in a field, $GF(2^n)$, wherein n is an integer greater than zero.

In yet another aspect, a third value is generated by performing a logical operation between at least a portion of the random challenge word, RND, and at least a portion of the secret key value, K. A fourth value is generated by performing a logical operation between at least another portion of the random challenge word, RND, and at least another portion of the secret key value, K. The LFSR circuitry is caused to generate a third pseudorandom value from the third value; and the additional circuitry is caused to be utilized as the second linear feedback shift register that generates a fourth pseudorandom value from the fourth value. A second key value, K", is generated from the third pseudorandom value and the fourth pseudorandom value by causing the LFSR circuitry and the additional circuitry to function together as the key generator. The additional circuitry is caused to combine the second key value, K", with $(m_1 K'+m_2 K'^2+\ldots+m_l K'^l)$, thereby generating a message authentication code, MAC:

$$MAC=K''+m_1 K'+m_2 K'^2+\ldots+m_l K'^l.$$

In some embodiments, generating an authentication code involves generating a plurality of control signals that cause linear feedback shift register (LFSR) circuitry, multipurpose logic circuitry, summation circuitry, and substitution logic circuitry to function together as a stream cipher generator. Additionally, the LFSR circuitry and the feedback circuitry of the multipurpose logic circuitry are caused to function together as a multiplier and a product of multiplication generated thereby is stored into a shift register of the multipurpose logic circuitry.

The LFSR circuitry includes a shift register and feedback circuitry, wherein the feedback circuitry is configured to generate a feedback signal derived from one or more output signals supplied by a corresponding one or more stages of the shift register. The feedback circuitry is configured to generate the feedback signal in accordance with a function specified by one or more of the control signals, and is configured to make the feedback signal available to an input stage of the shift register.

The multipurpose logic circuitry comprises the shift register and feedback circuitry, wherein signals to be fed back through the feedback circuitry of the multipurpose logic circuitry are selectively supplied by one of at least two sources:

(1) one or more output signals supplied by a corresponding one or more stages of the shift register of the LFSR circuitry; or by (2) one or more output signals supplied by a corresponding one or more stages of the shift register of the multipurpose logic circuitry.

Also, the feedback circuitry of the multipurpose logic circuitry is configured to generate a feedback signal in accordance with a function specified by one or more of the control signals, and is configured to make the feedback signal available to an input stage of the shift register of the multipurpose logic circuitry.

The above-mentioned summation circuitry is for summing signals supplied by the LFSR circuitry, the multipurpose logic circuitry, and substitution logic circuitry. And, the substitution logic circuitry has an input port for receiving one or more signals supplied by the summation circuitry, and an output port for supplying signals to the summation circuitry.

In another aspect, a shift register, denoted K'-register, is operated to receive and store one or more signals supplied by the summation circuitry.

In yet another aspect, a dual-base representation of a value 1 is loaded into the shift register of the LFSR circuitry; and output signals of the K'-register are caused to be supplied to the multipurpose logic circuitry for use as an operand during multiplication. This is useful for generating a dual-base representation of the value stored in the K'-register.

In still another aspect, in response to a third state of the control signals, a value from the shift register of the multipurpose logic circuitry is copied into the shift register of the LFSR circuitry. As an example of the utility of this function, this permits a result from a previous operation to be used in a subsequent multiplication operation.

In yet another aspect, the following operations are performed concurrently:

the LFSR circuitry and the feedback circuitry of the multipurpose logic circuitry are caused to function together as a multiplier that generates a first product and the first product is stored into the shift register of the multipurpose logic circuitry as the first product is generated; and the LFSR circuitry and supplemental feedback circuitry are caused to function together as a multiplier that generates a second product and the second product is stored into a supplemental shift register as it is generated.

In embodiments consistent with this aspect, signals to be fed back through the supplemental feedback circuitry are output signals supplied by one or more stages of the shift register of the LFSR circuitry; and the supplemental feedback circuitry generates a feedback signal in accordance with a function specified by one or more of the control signals. The feedback signal is made available to an input stage of the supplemental shift register.

In still another aspect, a sum is generated by sequentially combining one or more signals supplied by the summation circuitry with a corresponding number of signals supplied by the supplemental shift register.

In yet another aspect, the sum is supplied to the supplemental feedback circuitry. The supplemental feedback circuitry is operated to supply the sum to the supplemental shift register.

In still another aspect, a message authentication code, MAC, is generated in an electronic circuit, wherein the MAC protects the integrity of a data value, PD. This involves receiving a random challenge word, RND, from a source that is external to the electronic circuit. A first function, G(RND,K), is evaluated that generates a first encrypted value, K', from RND and K, wherein K is a secret key value that is stored on the electronic circuit. A second function, F(RND,K), is evaluated that generates a second encrypted value, K", from RND and K. The message authentication code is generated in accordance with:

$$MAC = K'' + m_1 K'^1 + m_2 K'^2 + \ldots + m_l K'^l,$$

wherein $m_1, m_2, \ldots, m_l$ are derived by representing the data value, PD, as an l-tuple of elements in a field, $GF(2^n)$, wherein n is an integer greater than zero.

In another aspect, evaluating the first function G(RND,K) comprises generating a first value by performing a logical operation between at least a portion of the random challenge word, RND, and at least a portion of the secret key value, K. A second value is generated by performing a logical operation between at least another portion of the random challenge word, RND, and at least another portion of the secret key value, K. A first linear feedback shift register is utilized to generate a first pseudorandom value from the first value. A second linear feedback shift register is utilized to generate a second pseudorandom value from the second value. The first and second pseudorandom values are applied to a stream cipher generator to thereby generate the first encrypted value, K'.

In yet another aspect, evaluating the second function F(RND,K) comprises generating a third value by performing a logical operation between at least a portion of the random challenge word, RND, and at least a portion of the secret key value, K. A fourth value is generated by performing a logical operation between at least another portion of the random challenge word, RND, and at least another portion of the secret key value, K. The first linear feedback shift register is utilized to generate a third pseudorandom value from the third value. The second linear feedback shift register is utilized to generate a fourth pseudorandom value from the fourth value. The third and fourth pseudorandom values are applied to the stream cipher generator to thereby generate the second encrypted value, K".

In still another aspect, generating the message authentication code in accordance with $MAC = K'' + m_1 K'^1 + m_2 K'^2 + \ldots + m_l K'^l$ comprises concurrently operating first multiplier circuitry and second multiplier circuitry to concurrently generate respective $m_i K'^i$ and $K'^{i+1}$ terms, $1 \leq i \leq l$, wherein the first multiplier circuitry includes the first linear feedback shift register, and the second multiplier circuitry includes the first linear feedback shift register.

BRIEF DESCRIPTION OF THE DRAWINGS

The objects and advantages of the invention will be understood by reading the following detailed description in conjunction with the drawings in which:

FIG. 4b is a table of a Walsh Spectrum of exemplary Boolean function used in an IIR filter in an aspect of embodiments consistent with the invention.

DETAILED DESCRIPTION

Figure 1:
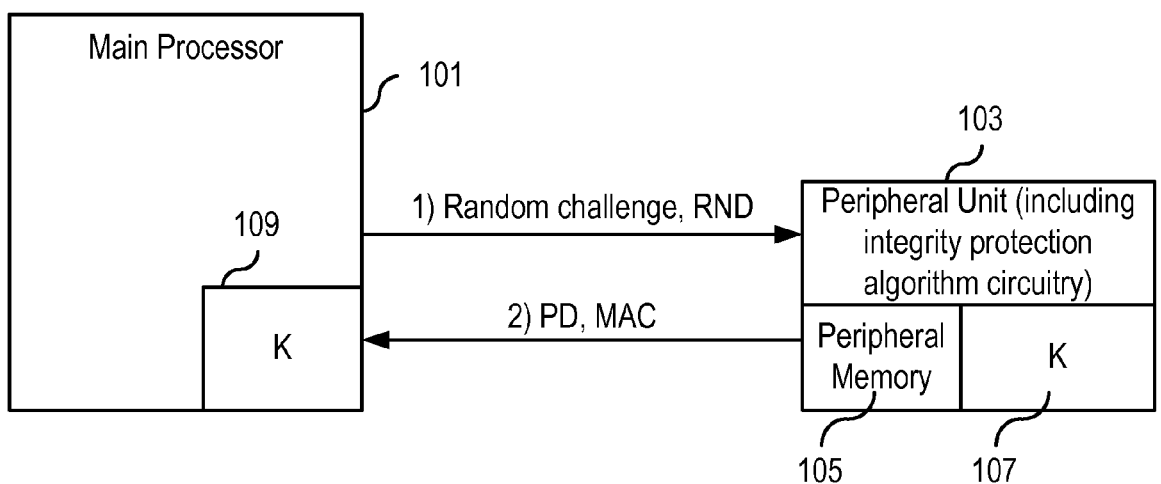
FIG. 1 is a block diagram of an arrangement whereby an OTP memory is implemented in a peripheral unit that is external to an integrated circuit housing a main processor.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, optical disk or carrier wave (such as radio frequency, audio frequency or optical frequency carrier waves) containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

Aspects of the invention are applicable to, but not limited to, an authentication procedure as described in the Background section and as illustrated in FIG. 1, which is a block diagram of an exemplary arrangement whereby a peripheral memory (e.g., an OTP memory) is implemented in a peripheral unit that is external to an integrated circuit that includes a main processor. Accordingly, a PD read procedure includes a main processor 101 issuing a random challenge, RND, towards a peripheral unit 103 (step 1) that includes a peripheral memory 105. The random challenge (RND), the peripheral memory content (PD) and a secret key 107 shared between the unit with the main processor and the peripheral unit are used as inputs to an integrity protection algorithm. The PD together with a Message Authentication Code (MAC) from the integrity protection algorithm are then sent back to the main processor 101 (step 2). A MAC is a value generated as a function of a message (in this case, the PD read out from the peripheral unit's memory) and a secret key, K, stored in the peripheral unit 103. The main processor 101 checks the validity of the received PD by determining whether the received integrity value (MAC) is what would have been expected based on the received PD, its own copy of the secret key K 109, and its knowledge of the random challenge RND that was initially sent.

An aspect of embodiments of the invention relates to a particular form of mathematical function for use in generating the MAC.

Another aspect of embodiments of the invention relates to efficient hardware configurations and algorithms capable of calculating the MAC generation function.

These and other aspects are now described in greater detail in the following.

Let H denote the MAC function; that is, MAC=H(K, RND, PD). The MAC function can be divided into three different, distinct parts:
 a masking key derivation part;
 an integrity key derivation part; and
 an unconditionally secure MAC part.

The unconditionally secure MAC part will herein be denoted by the function H'( ). The integrity key derivation part will herein be denoted by the function G( ), and the integrity key that it generates will herein be denoted by K'; that is, K'=G(RND,K) (where RND is the random challenge and K is the secret key described earlier). The integrity key, K', serves to give the data integrity protection against substitution attacks.

The masking key derivation function is herein denoted by F0, and the masking key that it generates is herein denoted by K", that is, K"=F(RND,K). The masking key serves to mask/blind the integrity-protected data, thereby adding increased security.

A function H, satisfying the above-stated criteria, can take any of a number of different forms. Exemplary embodiments of the invention use a form of the function (herein denoted H') that takes the message to be protected as input together with two key values. A first of these keys is the integrity key, K', and a second of these keys is the masking key, K". Hence, the exemplary MAC function can be expressed as:

$$MAC=H(K,RND,PD)=H'(K'',K',PD)=H'(F(RND,K),G(RND,K),PD)$$

Functions exhibiting very high security can be constructed using polynomial evaluation. This general principal is known, and therefore need not be described herein in detail. The interested reader can refer to G. Kabatanskii, B. Smeets, and T. Johansson, "On the cardinality of systematic authentication codes via error-correcting codes", *IEEE transaction on information theory*, vol. 42, no. 2, 1996 for more information.

Embodiments of the invention utilize this characteristic by employing polynomial evaluation in the MAC function, H'. As a result, calculating any given value for H' involves three main tasks: key generation, multiplication, and addition. Efficient methods and means for doing all three are presented herein.

Generating a pseudorandom key from an initial value can be accomplished by means of summation combiner stream cipher technology such as that which is described in, for example, J. L. Massey and R. A. Rueppel, "Method of, and Apparatus for, Transforming a Digital Sequence into and Encoded Form, U.S. Pat. No. 4,797,922, 1989; and Gehrmann, J. Persson and B. Smeets, *Bluetooth Security*, pp. 74-80, Artech House, 2004. Such technology relies on the use of Linear Feedback Shift Registers ("LFSR", wherein the term "LFSR" refers to the combination of a shift register and associated feedback circuitry) and additional supporting logic circuitry.

Polynomial multiplication can also be achieved very efficiently using LFSRs and low complexity supporting hardware. Thus, in accordance with an aspect of embodiments consistent with the invention, a set of LFSRs are employed for the dual purpose of key generation and multiplication. This allows construction of a very efficient hardware implementation of the complete function H, as will be seen from the following.

Denote a finite field of size $2^n$ by $GF(2^n)$. Express the PD as an l-tuple of elements in this field, that is, $PD=(m_1, m_2, \ldots, m_l)$; $m_i \in GF(2^n)$. The function $H'(K'',K',PD)$ can then be expressed as:

$$H'(K'',K',PD)=K''+m_1 K'+m_2 K'^2+\ldots+m_l K'^l \quad (1)$$

If the keys K' and K" are chosen completely at random for each new MAC calculation, the probability of a successful substitution attack equals $1 \times 2^{-n}$. But, assuming that cryptographically sound functions F and G can be found, it can be argued that this theoretical value also holds when replacing true random values K' and K" with keys derived from K and RND by means of the functions F and G.

Figure 2:
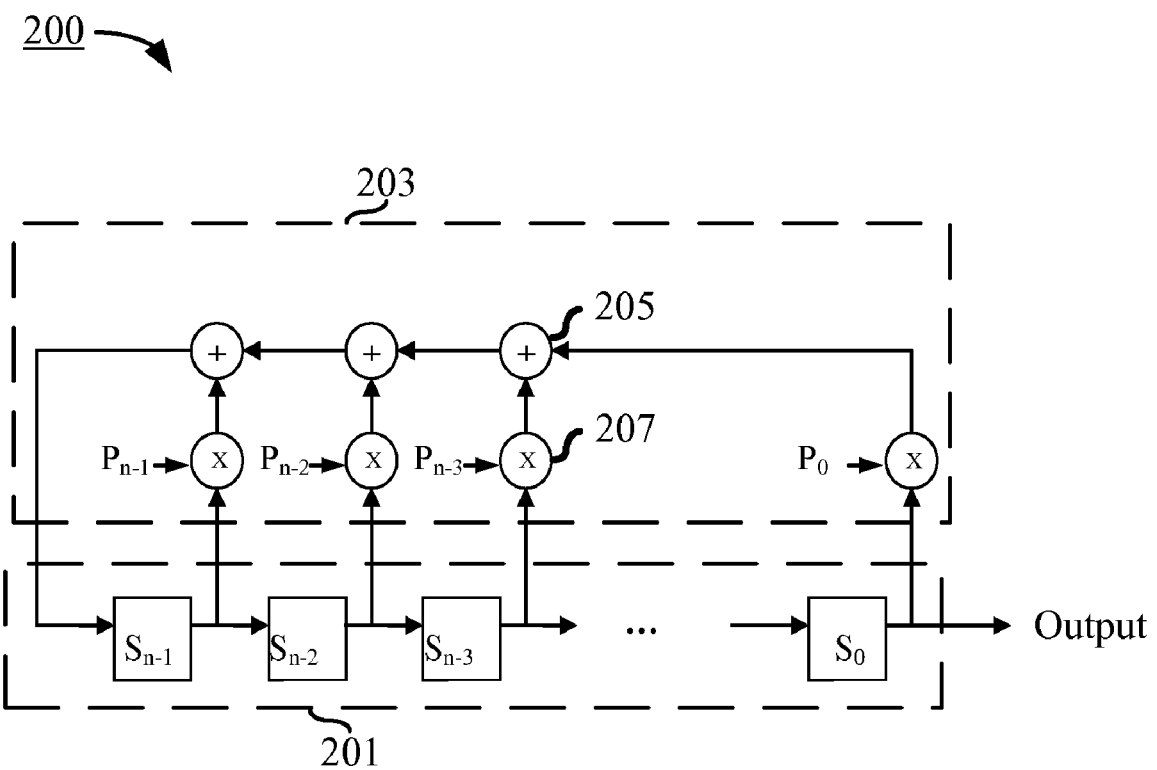
FIG. 2 is a block diagram of an exemplary linear feedback shift register.

LFSRs are employed in both key generation and multiplication, and therefore play an important role in various embodiments of the invention. FIG. 2 is a block diagram of an exemplary LFSR 200. The LFSR 200 includes a shift register 201 having a plurality, n, of stages including an input stage $S_{n-1}$, and an output stage $S_0$. The LFSR 200 further includes multistage feedback logic 203 having a plurality of inputs, including a first input connected to receive an output signal supplied by the output stage $S_0$ of the shift register 201, and at least one other input connected to receive an output signal supplied by a corresponding other one of the stages of the shift register 201. The multistage feedback logic 203 comprises a number of stages arranged such that each stage generates a feedback signal comprising the sum of a corresponding input signal (supplied by a corresponding stage of the shift register 201) and a feedback signal generated by a neighboring preceding stage of the multistage feedback logic 203.

The number and location of the other inputs of the multistage feedback logic 203 will vary from application to application. The exemplary embodiment depicted in FIG. 2 is a general-case embodiment that permits reconfiguration of the LFSR 200 in the following way. Each of the other stages (i.e., the stages other than the input stage) comprises an adder (e.g., the adder 205) and a multiplier (e.g., a multiplier 207). The multiplier 207 receives a signal from the output of a corresponding stage of the shift register 201 and a term from a polynomial (e.g., $P_{n-3}$). The output of the multiplier 207 represents the product of the shift register output signal and the polynomial term. This product is supplied to one input of the adder 205. Another input of the adder 205 receives the feedback signal from a neighboring preceding stage (in this example, the feedback signal generated by stage 0). The output of the adder 205 represents the sum of its two inputs; this output is supplied to a next stage in the multistage feedback logic 203, unless there are no additional stages, in which case this output is the output signal from the multistage feedback logic 203.

It will be seen that the function of the multistage feedback logic 203 can be changed by changing the polynomial terms $P_0 \ldots P_{n-1}$. If it is anticipated that there will be no need to change the function of the multistage feedback logic 203 after it is constructed, hardware can be saved by eliminating the adder and multiplier associated with any stage for which the polynomial term is zero, since the output of the corresponding multiplier will of necessity also be zero.

It will also be recognized that in embodiments employing only single-bit binary values at any stage, each of the multipliers can be constructed by a single logical "AND" gate, and each of the adders can be constructed by a single logical "EXCLUSIVE OR" gate.

Figure 3:
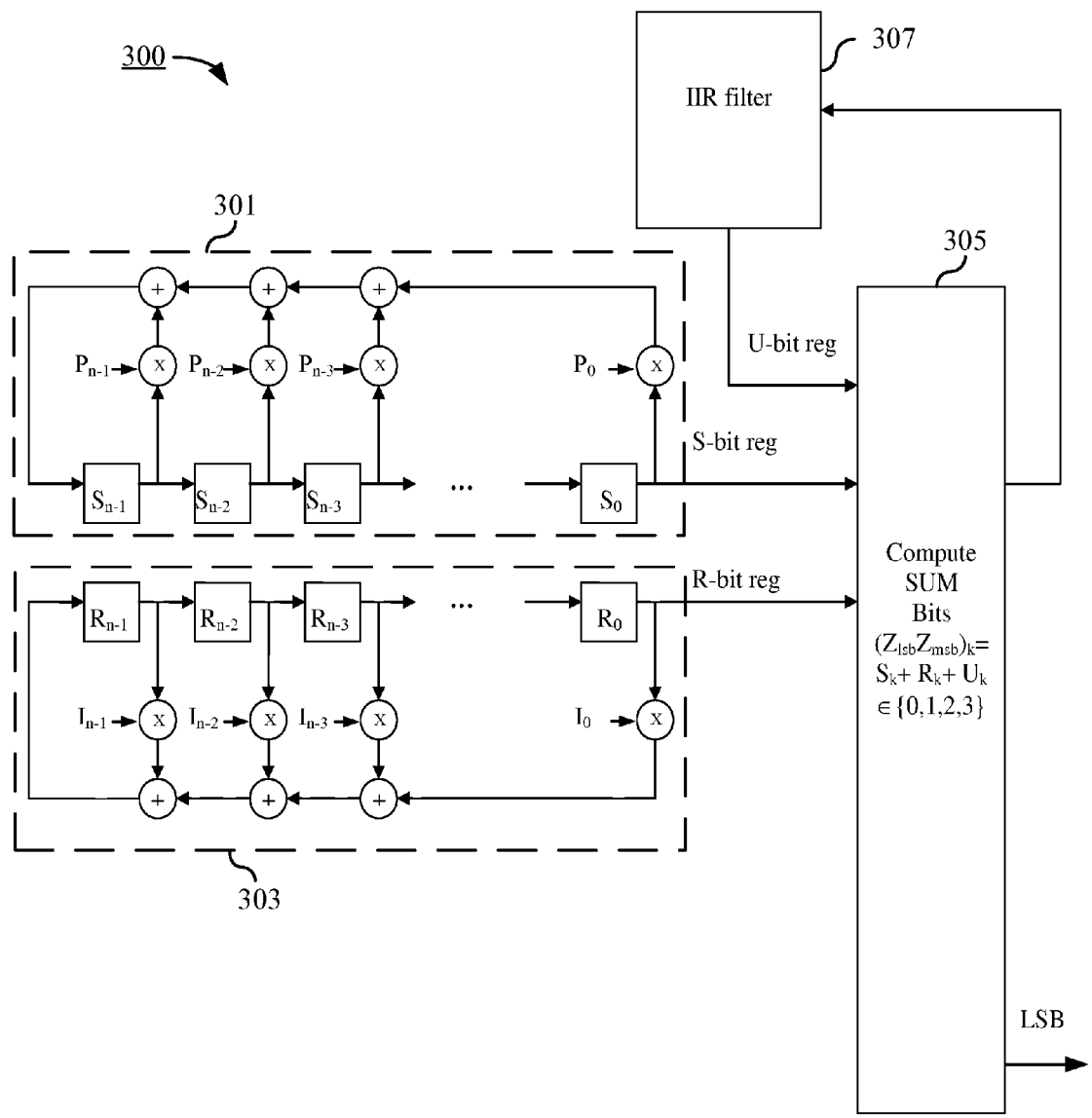
FIG. 3 is a block diagram of exemplary stream cipher circuitry in an aspect of embodiments consistent with the invention.

Turning now to the discussion of aspects of the MAC generation function, good key generation algorithms F and G can be constructed using the so-called summation combiner stream cipher mentioned earlier. FIG. 3 is a block diagram of exemplary circuitry 300 involved in this aspect of the invention. The circuitry 300 comprises a first LFSR 301 and a second LFSR 303. Each of the first and second LFSRs 301, 303 can be operated independent of other circuitry to generate a pseudorandom number in accordance with well-known principles. The first LFSR 301 has a feedback polynomial, $P_i$ ($0 \leq i \leq n-1$) preferably selected to obtain a maximum length sequence given the length of the first LFSR 301. The second LFSR 303 similarly has a feedback polynomial, $I_i$ ($0 \leq i \leq n-1$) preferably selected to obtain a maximum length sequence given the length of the second LFSR 303. The second feedback polynomial $I_i$ may be chosen to be the same as or different from the first feedback polynomial $P_i$.

The circuitry 300 further includes summation circuitry 305 and substitution logic exemplified by an Infinite Impulse Response (IIR) filter 307. The IIR filter 307 is situated in a feedback path between the output and input of the summation circuitry 305, and therefore supplies one of the inputs to the summation circuitry 305. The summation circuitry 305 also receives a second input from an output of the first LFSR 301, and receives a third input from an output of the second LFSR 303.

In this exemplary embodiment, each stage within the LFSRs 301, 303 constitutes only a single bit. The output of the IIR filter 307 is also only a single bit in this exemplary embodiment. Consequently, the output from the summation circuitry 305 will be a value in the range from zero to three, which can be represented by two binary digits. In this embodiment, the most significant of these binary digits is used as the input to the IIR filter 307. The least significant of these binary digits supplies the final output (i.e., the ciphered data) of the stream cipher generator.

It will be recognized then in alternative embodiments, each stage of the first and second LFSRs could be designed to hold multi-bit values. The remaining circuitry would be accordingly resized to accommodate this change. However, for the sake of simplicity and without any implication or restriction regarding other possible embodiments that are within the scope of the invention, the remainder of this description will assume single-bit embodiments.

Figure 4A:
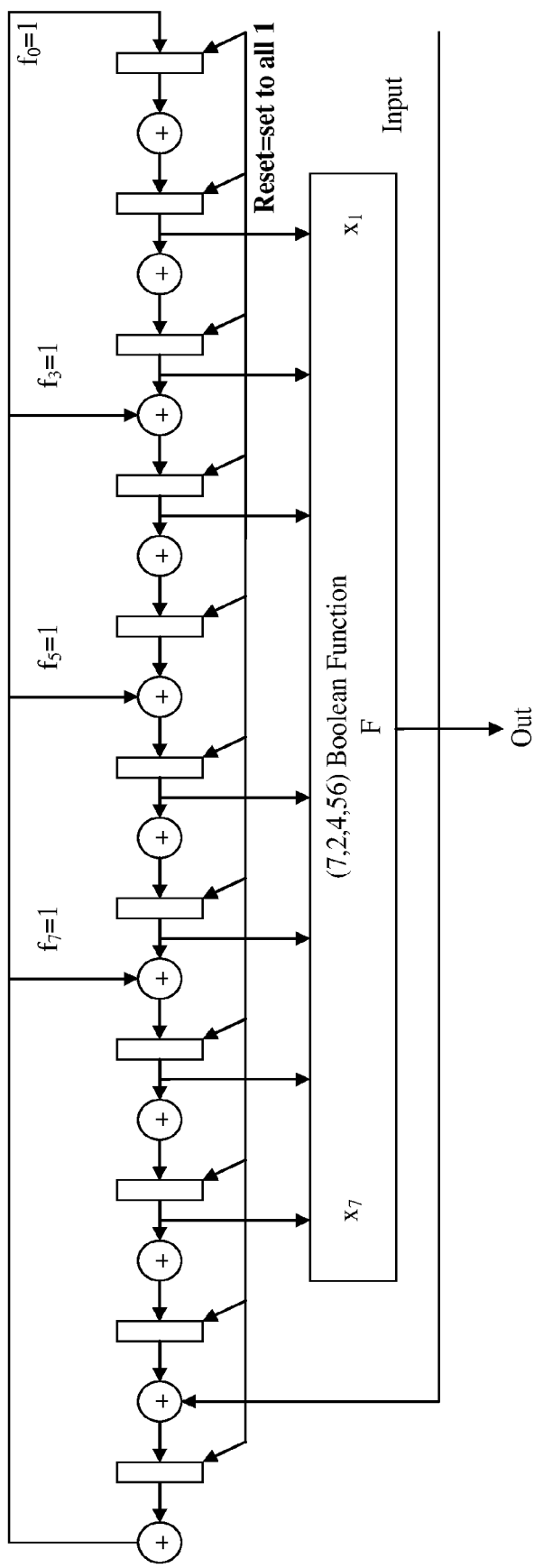
FIG. 4a illustrates exemplary inputs to a function used in an IIR filter in an aspect of embodiments consistent with the invention.
Figure 4B:
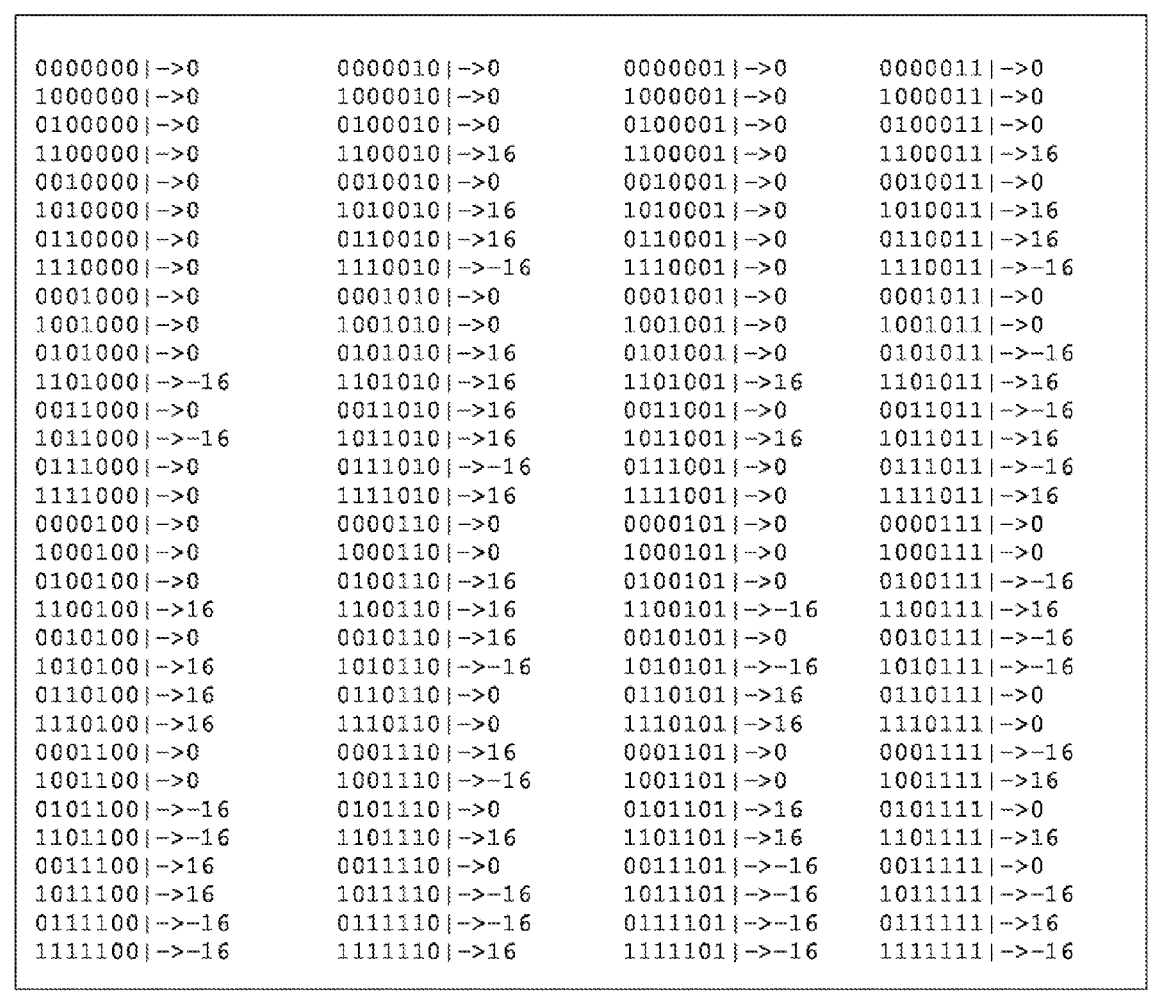

In this exemplary embodiment, the IIR filter 307 comprises a dual implementation of a linear shift register of length 11 with, as feedback, a polynomial $f(x)=1+f_1 x + f_2 x^2 + \ldots + f_{10} x^{10} + x^{11}$ (over GF(2)). For example, one could choose $f(x)=1+x^3+x^5+x^7+x^{11}$. In this case, the output of the IIR filter 307 is a function value of a $4^{th}$ order 2-correlation immune Boolean function (F) in 7 variables. In fact it is a (7, 2, 4, 56) function. The inputs to the function are shown in FIG. 4a. This means that the non-linear order is 2 and that there is no correlation between any two input variables and the output of the functions. The function has distance 56 from linear structures. There are several Boolean functions (F) having these same parameters, and any of these can be used. As an example, FIG. 4b is a table showing a Walsh Spectrum of one of these Boolean Functions.

Figure 5:
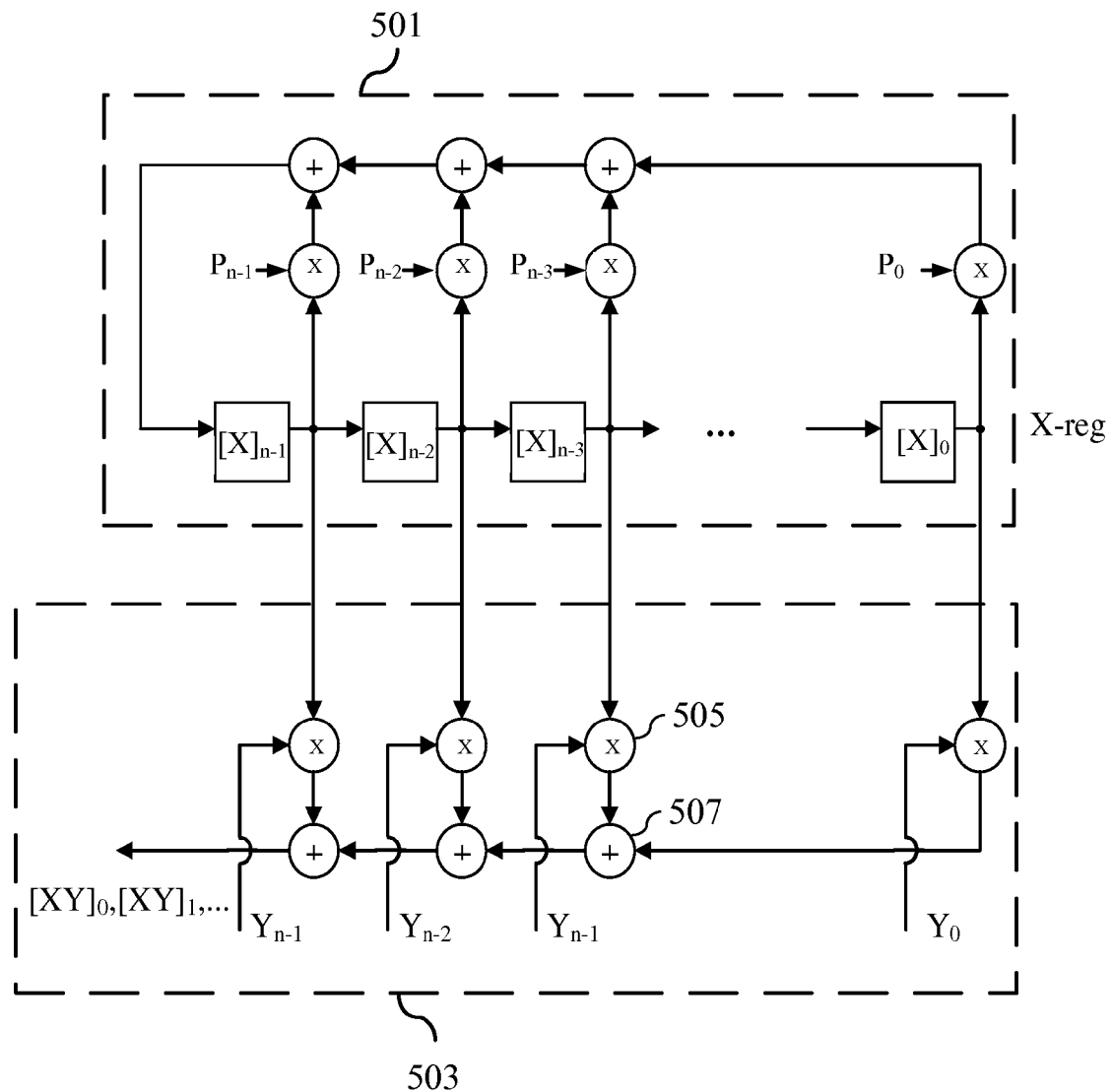
FIG. 5 is a block diagram of a well known dual-base bit serial multiplier capable of multiplying $y \in GF(2^n)$ with $x \in GF(2^n)$ in a sequential way (in n steps).

The discussion will now focus on aspects of embodiments of the invention related to the performance of multiplication. FIG. 5 is a block diagram of a well known dual-base bit serial multiplier capable of multiplying $y \in GF(2^n)$ with $x \in GF(2^n)$ in a sequential way (in n steps). Here y is represented in the normal (standard) basis $y=y_0+y_1\alpha+y_2\alpha^2+ \ldots +y_{n-1}\alpha^{n-1}$, where $\alpha \in GF(2^n)$ is a zero of the polynomial $p(t)=p_0+p_1 t + p_2 t^2 + \ldots + p_{n-1} t^{n-1}+p_n t^n$, $p_i \in GF(2)$, and $y_i \in GF(2)$ are the coordinates of y. Now let $\beta_0, \beta_1, \ldots, \beta_{n-1}$ be a so-called (trace) dual basis as described in, for example, R. J. McEliece, *Finite Fields for Computer Scientists and Engineers*, pp. 97–118, Kuwer 1987. That is, $TR(\alpha^i \beta_j)=1$, if $i=j$ and 0 otherwise.

Here Tr( ) denotes the trace function. It is then possible to express x by its dual representation as follows:

$x=[x]_0 \beta_0 + [x]_1 \beta_1 + [x]_2 \beta_2 + \ldots + [x]_{n-1} \beta_{n-1}$, $[x]_i \in GF(2)$ Note that the [.] notation is used herein to denote the dual coordinates.

To carry out multiplication between a quantity X and a quantity Y using the configuration of FIG. 5, a dual-base representation of X is stored into the shift register of an LFSR 501. Terms of the polynomial $P_i$ ($0 \leq i \leq n-1$) are applied to respective inputs of the LFSR's multipliers to achieve the required feedback in accordance with principles known in the art.

A second arrangement of multistage feedback logic 503 is provided that comprises a number of stages, each stage comprising a multiplier (e.g., the multiplier 505) and an adder (e.g., the adder 507). At each stage, the multiplier generates the product of an output signal supplied by a corresponding stage of the shift register of the LFSR 501 and a corresponding portion (e.g., bit) of the quantity Y. The stages of the second multistage feedback logic 503 are arranged such that each stage generates a feedback signal comprising the sum of its own multiplier output and a feedback signal generated by a neighboring preceding stage of the second multistage feedback logic 503. When the shift register of the LFSR 501 is clocked n times, the product XY (in dual-base representation) is sequentially supplied at the output of the final stage of the second multistage feedback logic 503.

Figure 6:
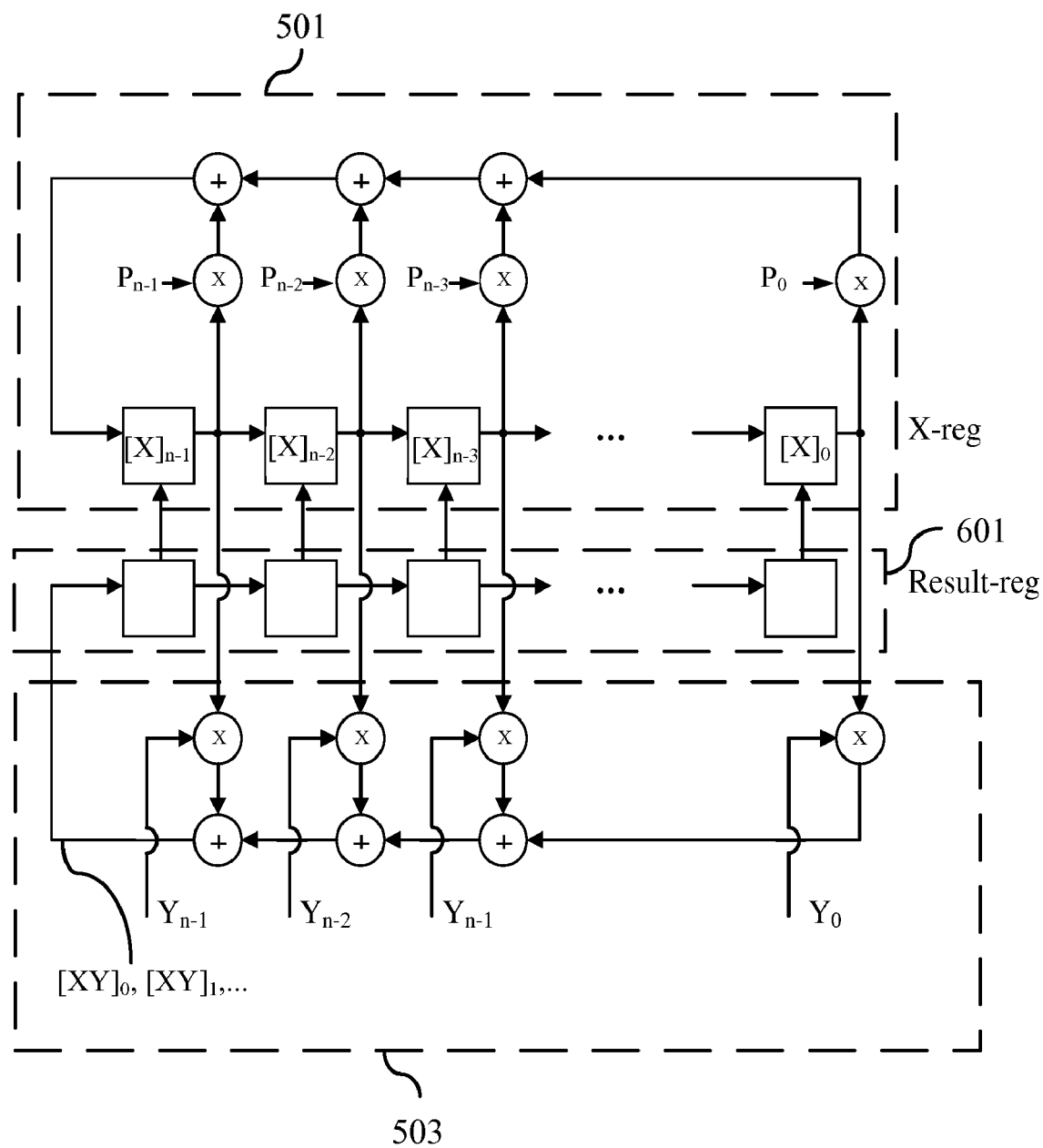
FIG. 6 is a block diagram showing a multiplier equipped with a register for receiving the result of multiplication.
Figure 7:
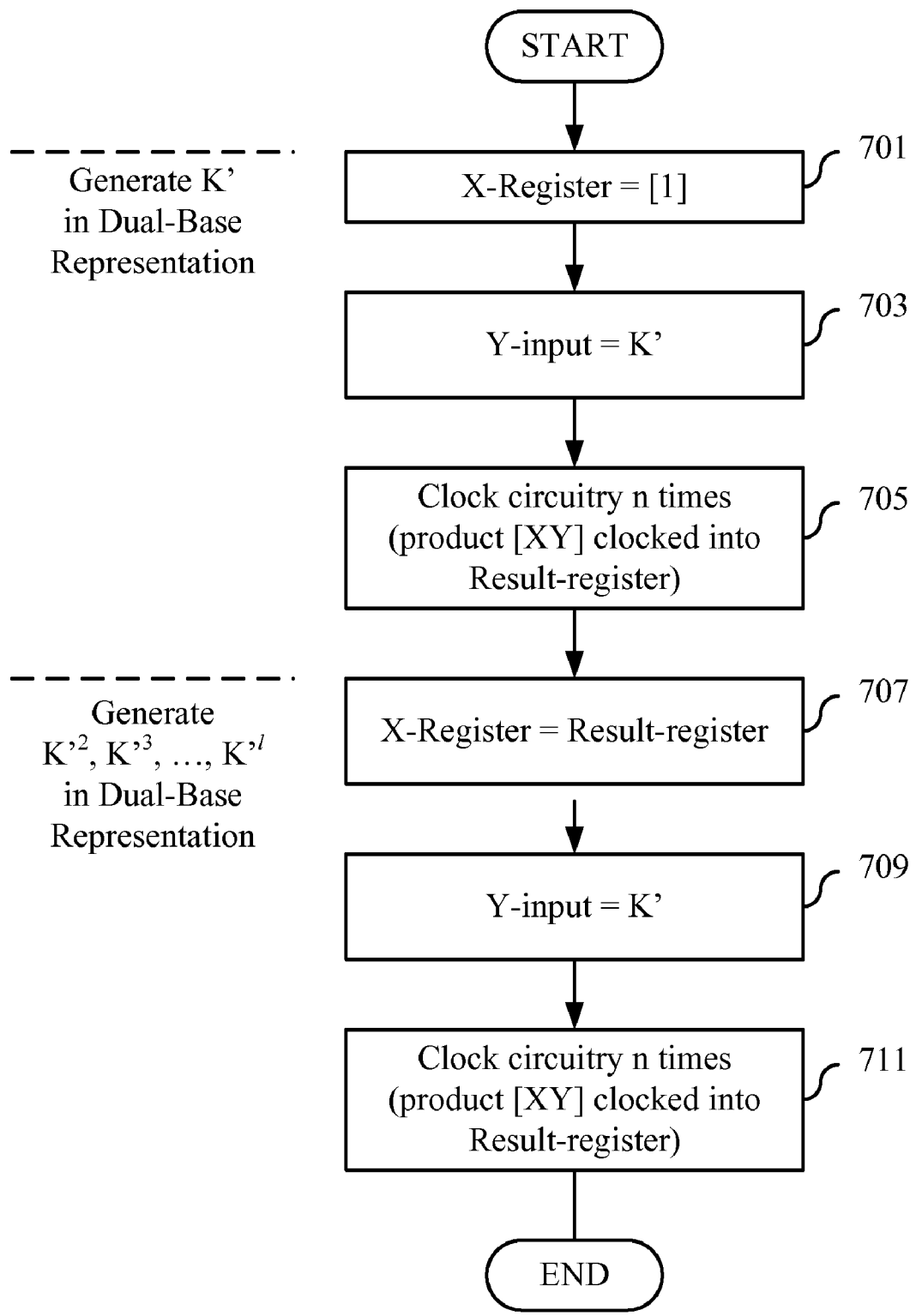
FIG. 7 is a flow chart depicting steps performed in an exemplary process consistent with the invention.

FIG. 6 is a block diagram showing the same multiplier equipped with a register 601 for receiving the result of the multiplication. Connections between the stages of the result register 601 and a shift register of the LFSR 501 permit the contents of the result register 601 to be fed back into the shift register of the LFSR 501. As will now be described with reference not only to FIG. 6 but also to FIG. 7, which is a flow chart depicting steps performed in the exemplary process, this construction is beneficial for computing the numbers K', $K'^2, \ldots, K'^{l}$ as needed in Equation (1).

As an initial step, it is desired to load the shift register of the LFSR 501 (hereinafter referred to as the X-register) with a dual-base representation of K'. This may be performed in any of a number of different ways. For example, the required quantity can be computed in other circuitry and then clocked into the X-register. In order to avoid overly complicating the figure, the connections for accomplishing this are not depicted, but would be readily ascertainable by one of ordinary skill in the art.

Alternatively, and in accordance with another aspect of various embodiments of the invention, the depicted circuitry is utilized to determine the dual-base representation of K'. This is achieved by first loading the X-register with the dual-base representation of the number 1 (which is a constant that may simply be stored in a memory device not shown in figure and retrieved when needed) (step 701). (Throughout this description, square brackets are used to denote the dual-base representation of the quantities represented within the brackets.) The value of K' is then applied to the Y inputs of the multiplier (step 703), and the X-register is clocked n times (step 705). In this way, the product 1×Y=K' is computed in n steps, with the dual-base representation of K' ending up in the result register 601.

In another aspect, the value of $K'^2$ may be computed by then copying the contents (=K') of the result register 601 into the X-register (step 707) and continuing to apply the value of K' to the Y inputs of the multiplier (709). The circuitry is then clocked another n times (step 711) which accomplishes the computation $K' \cdot K' = K'^2$, with the result (in dual-base representation) appearing in the result register 601. This sequence of operations (i.e., moving the last computed value from the result register 601 into the X-register, continuing to apply K' to the Y inputs of the multiplier, and then clocking the circuitry n times) can be repeated as needed to obtain increasing powers of K' up to $K'^u$, albeit in dual representation. However for applications calling for the computation of a MAC code (or similar applications) the result can be left in dual-base representation because the mapping from dual to normal basis is a linear mapping and hence will not affect the security parameters of the MAC code.

Figure 8:
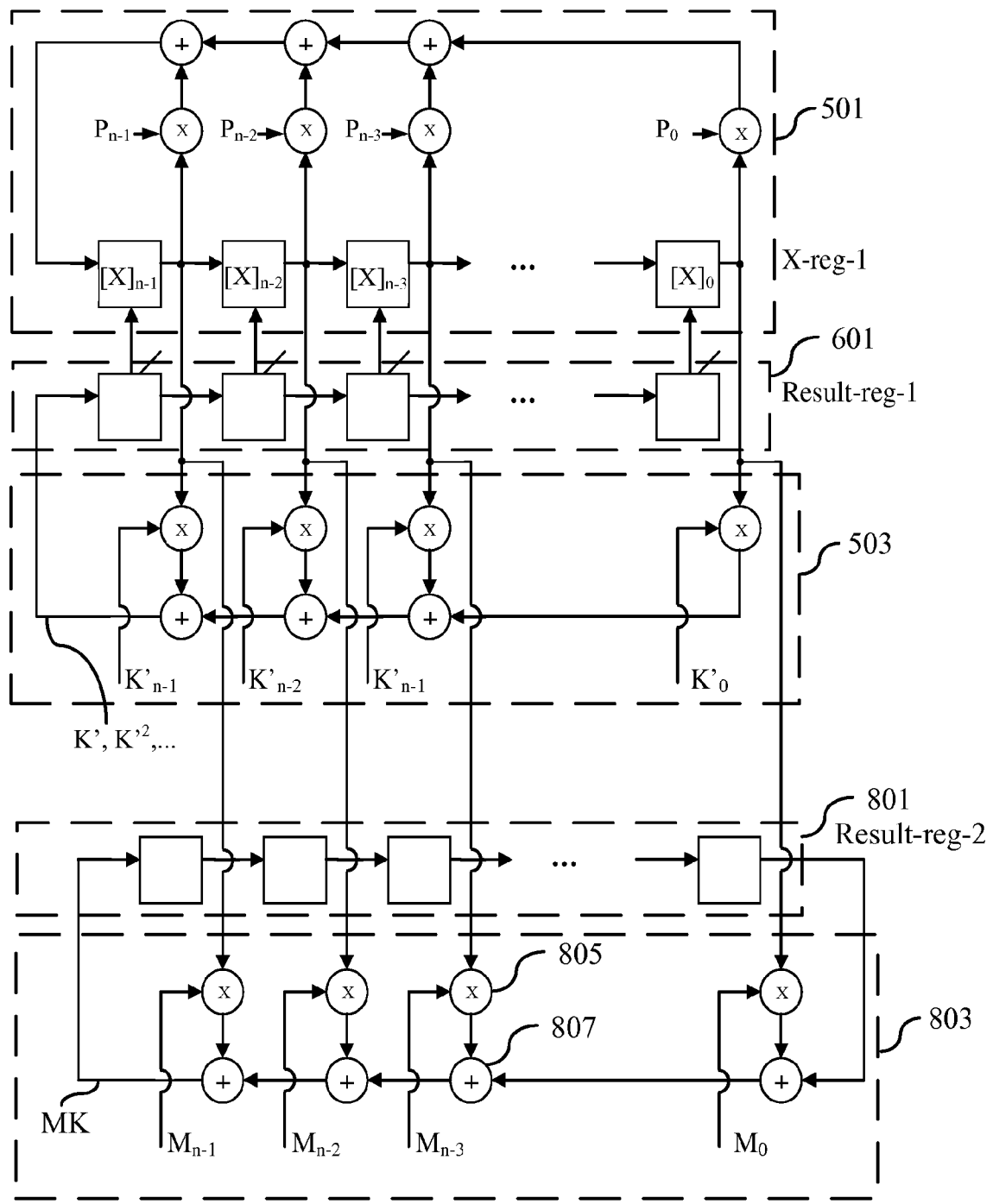
FIG. 8 is a block diagram of a circuit arrangement that illustrates advantages of adding a second result register and a third multistage feedback register to the arrangement depicted in FIG. 6.

FIG. 8 is a block diagram of a circuit arrangement that illustrates additional advantages that can be achieved by adding a second result register 801 and third multistage feedback logic 803. The third multistage feedback logic 803 comprises a number of stages, each stage comprising a multiplier (e.g., the multiplier 805) and an adder (e.g., the adder 807). At each stage, the third multiplier generates the product of an output signal supplied by a corresponding stage of the X-register of the LFSR 501 and a corresponding portion (e.g., bit) of the quantity M. The stages of the third multistage feedback logic 803 are arranged such that each stage generates a feedback signal comprising the sum of its own multiplier output and a feedback signal generated by a neighboring preceding stage of the third multistage feedback logic 803. When the shift register of the LFSR 501 is clocked n times, the product XM (in dual-base representation) is sequentially supplied at the output of the final stage of the third multistage feedback logic 803. A connection between the final stage of the third multistage feedback logic 803 and an input stage of the second result register 801 permits the product XM to be sequentially clocked into the second result register 801 as it is generated. Advantageously, this can be performed concurrently with the clocking of a product out of the final stage of the second multistage feedback logic 503 into the first result register 601.

By having two dual multipliers one can now easily compute $m_1 K' + m_2 K'^2 + \ldots + m_j K'^u$. One multiplier (combination of LFSR 501 and second multistage feedback logic 503) computes the dual representations of $K', K'^2, \ldots, K'^u$ and the other multiplier (combination of LFSR 501 and third multistage feedback logic 803), running in parallel, computes the products $m_i K'^u$ from the $K'^u$s as computed by the other multiplier.

As will now be shown, the addition of a relatively small amount of logic circuitry permits the quantity $m_1 K' + m_2 K'^2 + \ldots + m_j K'^u$ to be easily computed and collected in the second result register 801. Furthermore, the logic in the two multipliers can be reused to generate not only K' but also K".

Figure 9:
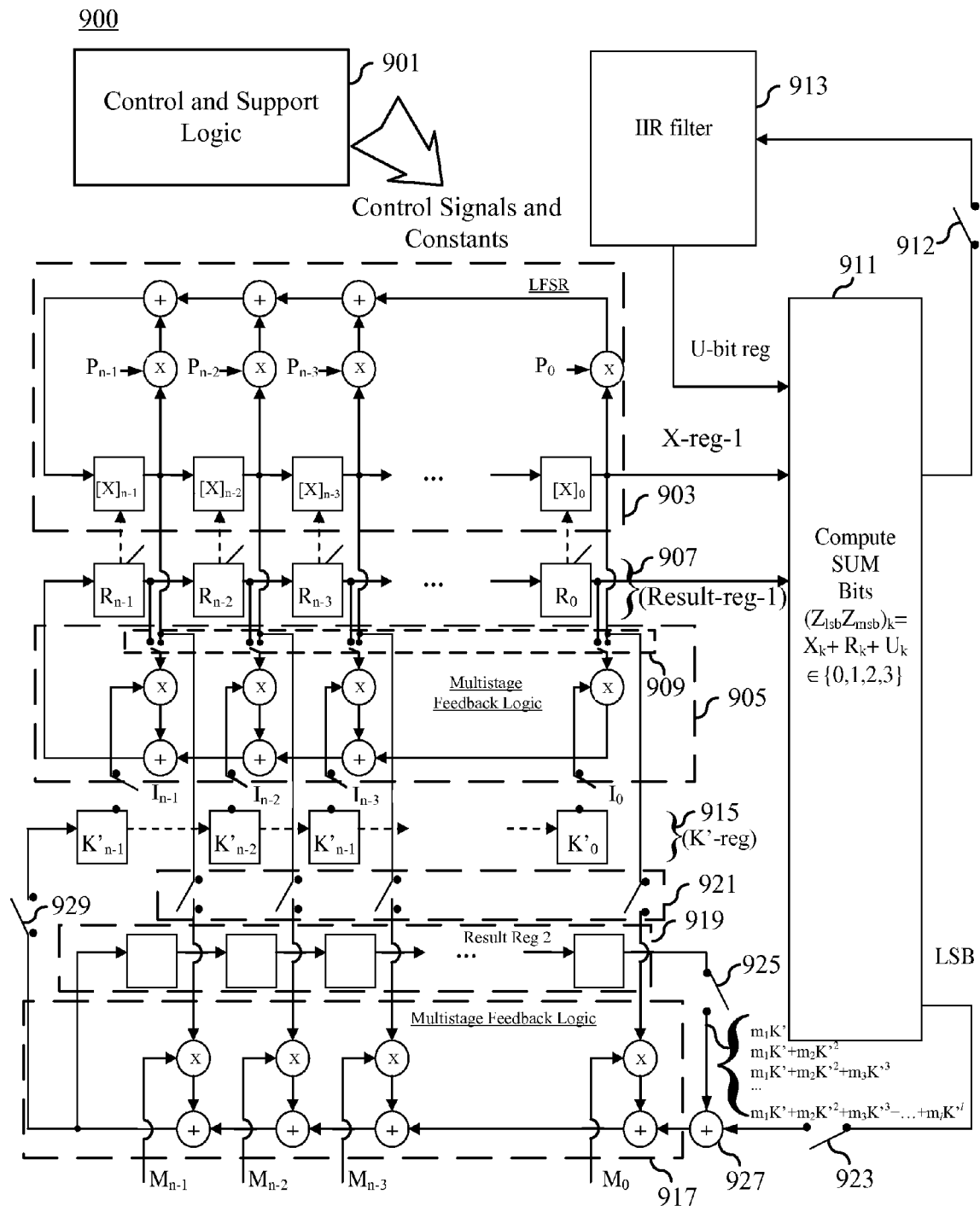
FIG. 9 is a block diagram of an exemplary embodiment of circuitry capable of generating K' and K" and of then using these values to compute a MAC value.

FIG. 9 is a block diagram of an exemplary embodiment of circuitry 900 capable of generating K' and K" and of then using these values to compute a MAC value in accordance with Equation (1). The circuitry 900 includes control and support logic 901 that generates all of the control signals and constants that are used in the following described hardware. The control and support logic 901 may be implemented as hardwired and/or programmable logic, the design of which will be readily apparent from the following description to one of ordinary skill in the art.

The circuitry 900 includes an LFSR 903, first multistage feedback logic 905, and a first result register 907 having shift register functionality. Switchable connections between the first multistage feedback logic 905, the LFSR 903, and the first result register 907 enable these logic elements to function as described earlier in connection with FIG. 3 (e.g., in stream cipher mode), or alternatively as described earlier in connection with FIGS. 6 and 7 (in multiplier mode). In particular, a set of switches 909 permits the first multistage feedback logic 905 to obtain input signals from the various stages of either the shift register within the LFSR 903 or the first result register 907. Control of the switches 909 is governed by control signals generated by the control and support logic 901. The control and support logic 901 also generates signals that determine whether the contents of the first result register 907 will be clocked directly into the shift register within the LFSR 903 or whether the result register 907 will operate as an independent shift register. It is noted that in FIG. 9, the switches 909 are depicted within the box identifying the first multistage feedback logic 905. However, one could just as easily consider the switches 909 to be a component separate and apart from the multistage feedback logic 905.

The circuitry 900 further includes summation circuitry 911 and substitution logic exemplified by an Infinite Impulse Response (IIR) filter 913. The IIR filter 913 is situated in a feedback path between the output and input of the summation circuitry 911, and therefore supplies one of the inputs to the summation circuitry 911. Under the direction of signals generated by the control and support logic 901, the summation circuitry 911 is also capable of receiving a second input from an output of the LFSR 903, and of receiving a third input from an output of the result register 907 configured to operate as a shift register.

When the switches 909 are configured to supply signals from the first result register 907 to the first multistage feedback logic 909, the result register 907 (operating as a shift register) in combination with the first multistage feedback logic 905 can be made to operate as a second LFSR with polynomial terms, $I_{n-1}, I_{n-2}, \ldots, I_0$ being generated by the control and support logic 901 and supplied to multiplier inputs located within the first multistage feedback logic 905.

The circuitry described up to this point is advantageously utilized to generate the K' term that is needed to generate the MAC in accordance with Equation (1). For example, a first portion (e.g., n bits) of the PD can be bitwise exclusive-OR'd (XOR'd) with a first portion of the random challenge RND and the result loaded into the X-reg of the LFSR 903. A second portion of the PD can be XOR'd with a second portion of the random challenge RND and that result loaded into the first result register 907. The first portion of the PD should not be the same as the second portion of the PD. Similarly, the first portion of the random challenge RND should not be the same as the second portion of the random challenge RND. By applying suitable terms from polynomials P and I to the multipliers in the first and second LFSRs, these in combination with the summation circuitry 911 and IIR filter 913 can be operated as a stream cipher generator described above in connection with FIG. 3 to generate, at the least significant bit (LSB) of the output of the summation circuitry 911, a stream of bits constituting the term K'. In preferred embodiments, a switch 912 leading to the input of the IIR filter 913 is closed, and the IIR filter 913 along with the contents of the X-register and first result register 907 are permitted to circulate (via their respective feedback circuitry) some number of times (e.g., 100 times). Circulating the X-register and first result register 907 better randomize the values contained therein, and clocking the IIR filter 913 helps to scrambles the state variables that are presented at the output of the summation circuitry 911.

Further clocking of this circuitry causes the value K' to be generated and made available at the LSB output of the summation circuitry 911. Another shift register, the K'-register 915, is provided for receiving and storing the generated value K'. Closing the switches 923 and 929 permits the value K' to be loaded into the K'-register 915 as soon as it is made available at the LSB output of the summation circuitry 911.

In another mode of operation, the polynomial $m_1K'+m_2K'^2+\ldots+m_lK'^l$ is generated. To accomplish this, the LFSR 903 is used in combination with the first multistage feedback logic 905, second multistage feedback logic 917, a second result register 919 having shift register functionality, and a second set of switches 921. The switches 909 are set to supply the outputs from the shift register within the first LFSR 903 to the multiplier inputs of the first multistage feedback logic 905 to create a first multiplier arrangement equivalent to that depicted in FIG. 6. As described earlier, this arrangement permits a multiplication to be performed between the contents of the X-register within the LFSR 903 and values supplied to the multiplier inputs of the first multistage feedback logic 905. In this instance, switches are set so that those values are supplied at outputs from the K'-register stages. Since it is necessary to have a dual-base representation of K', this can advantageously be generated by loading the dual-base representation of the number 1 into the X-register of the LFSR 903 and cycling the logic to perform a multiplication between the X-register of the LFSR 903 and the value of K' stored in the K'-register 915. The result will be the dual-base representation of K' stored in the first result register 907. In a next step, this value can be clocked into the X-register of the LFSR 903.

With the switches 923 and 925 set to their open positions (or in any alternative way ensuring that the value "0" is passed along), the arrangement is now ready to calculate the polynomial $m_1K'+m_2K'^2+\ldots+m_lK'^l$. The switches 909 continue to supply the outputs from the X-register within the LFSR 903 to the multipliers within the first multistage feedback logic 905. The switches 921 are also closed so that one input of the multipliers within the second multistage feedback logic 917 will be supplied by the corresponding stages of the X-register within the LFSR 903. The polynomial terms P within the LFSR 903 are set for multiplication. The other inputs of the multipliers within the second multistage feedback logic 917 are similarly set to be bits representing the term $m_i$, $0 \leq i \leq 1$ (see Equation (1)), where $m_1, m_2, \ldots, m_l$ are derived by representing the data value, PD, as an l-tuple of elements in a field, $GF(2^n)$. Results generated by the second multistage feedback logic 917 will be clocked into the second result register 919.

This arrangement is now configured much like that depicted in FIG. 8, and can be operated as described above with respect to that figure to generate the polynomial $m_1K'+m_2K'^2+\ldots+m_lK'^l$. In particular, when the shift register of the LFSR 903 is clocked n times, the product K'×[contents of X-register] (in dual-base representation) is sequentially supplied at the output of the final stage of the first multistage feedback logic 905 and this can be sequentially clocked into the input stage of the first result register 907. When the contents of the X-register are initialized as described above to store the dual-base representation of K', the first result register 907 will consequently have stored therein the value $K'^2$ at the conclusion of the multiplication operation. At the same time that this is happening, the product $m_i$×[contents of X-register] (in dual-base representation) is sequentially supplied at the output of the final stage of the second multistage feedback logic 917 and this can be sequentially clocked into the input stage of the second result register 919. When $m_i$ is set equal to the term $m_1$, the second result register 919 will consequently have stored therein the value $m_1K'$ after the first iteration.

By clocking the contents of the first result register 909 into the X-register of the LFSR 903 and also closing the switch 925 (so that the value $m_1K'$ will be sequentially supplied to an adder 927), the value $K'^2$ can be generated and clocked into the first result register 907 by clocking the shift register of the LFSR 923 another n times. Concurrently with this, $m_i$ is set equal to the next term, $m_2$, so that the value $m_1K'+m_2K'^2$ is generated and clocked into the second result register 919.

Further iterations of this process generate higher powers of K' (stored in the first result register 907) and further computation of Equation (1) until finally, the polynomial $m_1K'+m_2K'^2+\ldots+m_lK'^l$ has been computed and stored into the second result register 919.

In a next phase of processing, the control and support logic 901 generates signals that ensure that the contents of the second result register 919 will remain stable while a value for K" is generated. Generation of the value K" preferably follows the same steps described above with respect to generation of the value K'. That is, the result register 907 is operated as an independent shift register, and the first multistage feedback logic 905, summation circuitry 911, and IIR filter 913 are configured to operate in conjunction with the LFSR 903 as a stream cipher generator. A portion of the PD can be bitwise XOR'ed with a portion of the random challenge, RND, and the result loaded into the X-register of the LFSR 903. Another portion of the PD can be bitwise XOR'ed with another portion of the random challenge, RND, and that result loaded into the first result register 907. The two portions of the PD should not be the same as one another. Similarly, the two portions of the random challenge RND should not be the same as one another. The polynomials P and I, suitable for cipher generation, are again supplied to the LFSR 903 and the first multistage feedback logic 905, respectively. The switch 912 leading to the input of the IIR filter 913 is closed, and the IIR filter 913 along with the X-register of the LFSR 903 and the first result register 907 are clocked some number of times (e.g., 150 times).

Then the switches 923 and 925 are closed. Further clocking of the circuitry causes the value K" to be sequentially shifted out of the LSB of the summation circuitry 911. With the switches 923 and 925 closed, the value $K''+m_1K'+m_2K'^2+\ldots+m_lK'^l$ is generated at the output stage of the second multistage feedback logic 917. This value can be stored into the second result register 919 from which it can be retrieved by the control and support logic 901 and used as the generated MAC value.

In the above arrangement, the I polynomial values are preferably set according to a polynomial of degree less than n (to get periods that are coprime).

The above described embodiment is merely exemplary and many alternative embodiments can be derived that are consistent with the various aspects of the invention. For example, when generating the term K', it was mentioned that initialization involves bitwise XOR'ing one or more portions of the PD with one or more portions of the random challenge, RND. In alternative embodiments, the resultant value(s) can be further XOR'ed with a constant that is unique to the function G( ).

Similarly, when generating the term K", it was mentioned that initialization involves bitwise XOR'ing one or more portions of the PD with one or more portions of the random challenge, RND. In alternative embodiments, the resultant value(s) can be further XOR'ed with a constant that is unique to the function F( ).

In other alternatives, the strength of the MAC can be improved by modifying the K' calculation process in the following way: Instead of directly reading the K' value at the output of the summation circuitry 911, the circuit can be run as previously explained to generate a value K̂. This value is then loaded into the first result register 907 while the X-register and the rest of the circuitry states are left unchanged. Then the circuit is clocked several times again and the value K' is read out from the summation circuitry 911. This calculation process can be iterated an arbitrary number of times if desired.

The above described embodiments have been presented in the context of providing integrity protection for data. However, various embodiments are not limited to this particular application. The very same circuitry can also be used to integrity protect data communication between two peers that share a symmetric key. In such a case, the challenge response scheme illustrated in FIG. 1 is not used. Instead the two peers may for example exchange two random numbers before the communication session starts. Then the initial keys can be generated from, for example, not just the random numbers and the shared key, K, but also from an index identifying which message this is in a sequence of messages to be protected. This allows separate keys K", and K' to be used for each new message without any new exchange of random data between the peers.

Various aspects of embodiments of the invention can also be extended to cover the case when the data is both confidentiality protected and integrity protected. In this case, the encryption engine (e.g., illustrated in FIG. 9) can also be used to encrypt the data before or after it is integrity protected. In this case the initialization key of the encryption engine should be different from the initialization keys used for integrity protection, that is, K' and K".

In other alternatives, those of ordinary skill will recognize that the basic construction described and illustrated in FIG. 9 can be extended to cover more shift registers and feedback polynomials but otherwise to keep the same basic structure. This would allow higher security at the cost of larger hardware.

The various embodiments allow a relatively very small integrity protection hardware implementation to be realized. Embodiments consistent with the invention can be used in secure storage applications and also in secure communication situations.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way.

For example, the detailed description of FIG. 9 focused on the operation of each exemplary element and of its interactions with other exemplary elements. It will be recognized, however, that the exemplary combination of elements illustrates a number of aspects that are involved in alternative embodiments as well. For example, the first multistage feedback logic 905, the first result register 907 and the switches 909 together exemplify an embodiment of multipurpose logic circuitry comprising a shift register and feedback circuitry, wherein signals to be fed back through the feedback circuitry of the multipurpose logic circuitry are selectively supplied by either:

1) one or more output signals supplied by a corresponding one or more stages of the shift register of the LFSR circuitry 903; or by 2) one or more output signals supplied by a corresponding one or more stages of the shift register of the multipurpose logic circuitry.

The feedback circuitry of the multipurpose logic circuitry is configured to generate a feedback signal in accordance with a function specified by one or more of the control signals, and is configured to make the feedback signal available to an input stage of the shift register of the multipurpose logic circuitry.

It is the ability of the feedback circuitry of the multipurpose logic circuitry's feedback circuitry to selectively obtain inputs from either the shift register of the LFSR 903 or from the multipurpose logic circuitry's own shift register (exemplified in FIG. 9 by the first result register 907) that permits it to be used in combination with the LFSR 903 to perform either stream cipher operations or multiplication functions.

Also, by further providing supplemental feedback circuitry (e.g., the second multistage feedback logic 917) connected to the shift register of the LFSR 903, concurrently operable multipliers (each including, in part, the same linear feedback shift register, e.g., the LFSR 903) are realized that permit concurrent multiplication operations to be performed. This, in turn, permits concurrent generation of respective $m_i K^{ni}$ and $K^{ni+1}$ terms, $1 \leq i \leq l$.

Viewed even more generically, embodiments comprise LFSR circuitry and additional circuitry connected to the LFSR circuitry, wherein a first state of the control signals causes the LFSR circuitry and the additional circuitry to function together as a key generator; and a second state of the control signals causes the LFSR circuitry and the additional circuitry to function together as a multiplier.

As another example of alternative embodiments, the embodiments of the invention that use the field $GF(2^n)$ have been described. However, those skilled in the art will recognize that alternative embodiments can instead use any field of type $GF((2^m))^n$, or even more exotic fields of type $GF((p^m))^n$, where "p" is a prime number.

In yet another example, the various embodiments described above all relied on LFSR configurations whenever finite state shift register functionality was required. However, stream cipher generation can also be achieved by means of non-linear finite state shift registers instead of LFSRs. Those skilled in the art will readily understand how various embodiments utilizing non-linear finite state shift registers in place of LFSRs can be derived from the principles and other teachings set forth above. In this specification, the term "finite state shift register" (FSR) is used generically to denote any type of shift register/feedback arrangement, regardless of whether that arrangement constitutes a linear feedback shift register or a non-linear feedback shift register.

Thus, the scope of the invention is given by the appended claims, rather than the preceding description, and all variations and equivalents which fall within the range of the claims are intended to be embraced therein.

What is claimed is:

1. An apparatus for generating an authentication code, the apparatus comprising:
   control and support logic for generating a plurality of control signals;
   linear feedback shift register (LFSR) circuitry comprising a shift register and feedback circuitry; and
   additional circuitry connected to the LFSR circuitry, wherein:
a first state of the control signals causes the LFSR circuitry and the additional circuitry to function together as a key generator; and
a second state of the control signals causes the LFSR circuitry and the additional circuitry to function together as a multiplier;
wherein the additional circuitry comprises:
multipurpose logic circuitry comprising a shift register and feedback circuitry, wherein:
  signals to be fed back through the feedback circuitry of the multipurpose logic circuitry are selectively supplied by either one or more output signals supplied by a corresponding one or more stages of the shift register of the LFSR circuitry or by one or more output signals supplied by a corresponding one or more stages of the shift register of the multipurpose logic circuitry; and
  the feedback circuitry of the multipurpose logic circuitry is configured to generate a feedback signal in accordance with a function specified by one or more of the control signals, and is configured to make the feedback signal available to an input stage of the shift register of the multipurpose logic circuitry;
summation circuitry for summing signals supplied by the LFSR circuitry, the multipurpose logic circuitry, and substitution logic circuitry; and
the substitution logic circuitry having an input port for receiving one or more signals supplied by the summation circuitry, and an output port for supplying signals to the summation circuitry,
and wherein:
the key generator is a stream cipher generator;
the first state of the control signals causes the LFSR circuitry, the multipurpose logic circuitry, the summation circuitry, and the substitution logic circuitry to function together as the stream cipher generator; and
the second state of the control signals causes the LFSR circuitry and the feedback circuitry of the multipurpose logic circuitry to function together as the multiplier.

2. The apparatus of claim 1, wherein the apparatus is part of an electronic circuit, and the apparatus comprises:
logic that receives a random challenge word, RND, from a source that is external to the electronic circuit;
logic that generates a first value by performing a logical operation between at least a portion of the random challenge word, RND, and at least a portion of a secret key value, K, wherein K is stored on the electronic circuit;
logic that generates a second value by performing a logical operation between at least another portion of the random challenge word, RND, and at least another portion of the secret key value, K,
wherein the control and support logic comprises logic that generates signals that:
cause the LFSR circuitry to generate a first pseudorandom value from the first value;
cause the additional circuitry to be utilized as a second linear feedback shift register that generates a second pseudorandom value from the second value;
cause the LFSR circuitry and the additional circuitry to function together as the key generator, and cause the key generator to generate a first key value, K', from the first pseudorandom value and the second pseudorandom value.

3. The apparatus of claim 2, wherein the control and support logic comprises logic that generates signals that:
cause the LFSR circuitry and additional circuitry to concurrently generate a series of terms $K'^{i+1}$ and $(m_1K' + m_2K'^2 + \ldots + m_lK'^l)$ $1 \leq i \leq l$, wherein $m_1, m_2, \ldots, m_l$ are derived by representing peripheral data, PD, as an l-tuple of elements in a field, $GF(2^n)$, wherein n is an integer greater than zero.

4. The apparatus of claim 3, comprising:
logic that generates a third value by performing a logical operation between at least a portion of the random challenge word, RND, and at least a portion of the secret key value, K;
logic that generates a fourth value by performing a logical operation between at least another portion of the random challenge word, RND, and at least another portion of the secret key value, K,
wherein the control and support logic comprises logic that generates signals that:
cause the LFSR circuitry to generate a third pseudorandom value from the third value;
cause the additional circuitry to be utilized as the second linear feedback shift register that generates a fourth pseudorandom value from the fourth value;
cause the LFSR circuitry and the additional circuitry to function together as the key generator, and cause the key generator to generate a second key value, K", from the third pseudorandom value and the fourth pseudorandom value; and
cause the second key value, K", to be combined with $(m_1K' + m_2K'^2 + \ldots + m_lK'^l)$, thereby generating a message authentication code, MAC:

$$MAC = K'' + m_1K' + m_2K'^2 + \ldots + m_lK'^l.$$

5. The apparatus of claim 1, wherein the second state of the control signals additionally causes a product of multiplication to be stored into the shift register of the multipurpose logic circuitry.

6. The apparatus of claim 1, comprising:
a shift register, denoted K'-register, operable to receive and store one or more signals supplied by the summation circuitry.

7. The apparatus of claim 6, comprising:
circuitry for loading a dual-base representation of a value 1 into the shift register of the LFSR circuitry; and
circuitry that causes output signals of the K'-register to be supplied to the multipurpose logic circuitry for use as an operand during multiplication.

8. The apparatus of claim 1, comprising:
circuitry, responsive to a third state of the control signals, for copying a value from the shift register of the multipurpose logic circuitry into the shift register of the LFSR circuitry.

9. The apparatus of claim 1, comprising:
a supplemental shift register; and
supplemental feedback circuitry, wherein:
  signals to be fed back through the supplemental feedback circuitry are output signals supplied by one or more stages of the shift register of the LFSR circuitry; and
  the supplemental feedback circuitry is configured to generate a feedback signal in accordance with a function specified by one or more of the control signals, and is configured to make the feedback signal available to an input stage of the supplemental shift register, wherein:
a third state of the control signals causes the following operations to be performed concurrently:
the LFSR circuitry and the feedback circuitry of the multipurpose logic circuitry functioning together as a multiplier that generates a first product and storing the first product into the shift register of the multipurpose logic circuitry as the first product is generated; and
the LFSR circuitry and the supplemental feedback circuitry functioning together as a multiplier that generates a second product and storing the second product into the supplemental shift register as it is generated.

10. The apparatus of claim 9, comprising:
an adder for sequentially combining one or more signals supplied by the summation circuitry with a corresponding number of signals supplied by the supplemental shift register.

11. The apparatus of claim 9, wherein:
the adder is connected to supply an output signal to the supplemental feedback circuitry; and
the supplemental feedback circuitry is connected to supply the output signal of the adder to the supplemental shift register.

12. A method for generating an authentication code in an apparatus comprising linear feedback shift register (LFSR) circuitry and additional circuitry connected to the LFSR, the LFSR comprising a shift register and feedback circuitry, the method comprising:
in a first mode of operation, causing the LFSR circuitry and the additional circuitry to function together as a key generator; and
in a second mode of operation, causing the LFSR circuitry and the additional circuitry to function together as a multiplier;
wherein the additional circuitry comprises:
multipurpose logic circuitry comprising a shift register and feedback circuitry, wherein:
signals to be fed back through the feedback circuitry of the multipurpose logic circuitry are selectively supplied by either one or more output signals supplied by a corresponding one or more stages of the shift register of the LFSR circuitry or by one or more output signals supplied by a corresponding one or more stages of the shift register of the multipurpose logic circuitry; and
the feedback circuitry of the multipurpose logic circuitry is configured to generate a feedback signal in accordance with a function specified by one or more of the control signals, and is configured to make the feedback signal available to an input stage of the shift register of the multipurpose logic circuitry;
summation circuitry for summing signals supplied by the LFSR circuitry, the multipurpose logic circuitry, and substitution logic circuitry; and
the substitution logic circuitry having an input port for receiving one or more signals supplied by the summation circuitry, and an output port for supplying signals to the summation circuitry,
and wherein:
the first mode of operation comprises causing the LFSR circuitry, the multipurpose logic circuitry, the summation circuitry, and the substitution logic circuitry to function together as the key generator; and
the second mode of operation comprises causing the LFSR circuitry and the feedback circuitry of the multipurpose logic circuitry to function together as the multiplier.

13. The method of claim 12, wherein the method is performed in an electronic circuit, and the method comprises:
receiving a random challenge word, RND, from a source that is external to the electronic circuit;
generating a first value by performing a logical operation between at least a portion of the random challenge word, RND, and at least a portion of a secret key value, K, wherein K is stored on the electronic circuit;
generating a second value by performing a logical operation between at least another portion of the random challenge word, RND, and at least another portion of the secret key value, K;
causing the LFSR circuitry to generate a first pseudorandom value from the first value;
causing the additional circuitry to be utilized as a second linear feedback shift register that generates a second pseudorandom value from the second value;
generating a first key value, K', from the first pseudorandom value and the second pseudorandom value by causing the LFSR circuitry and the additional circuitry to function together as the key generator.

14. The method of claim 13, comprising:
causing the LFSR circuitry and additional circuitry to concurrently generate a series of terms $K'^{i+1}$ and $(m_1 K'+m_2 K'^2+ \ldots +m_i K'^i)$, $1 \leq i \leq l$, wherein $m_1, m_2, \ldots, m_l$ are derived by representing peripheral data, PD, as an l-tuple of elements in a field, $GF(2^n)$, wherein n is an integer greater than zero.

15. The method of claim 14, comprising:
generating a third value by performing a logical operation between at least a portion of the random challenge word, RND, and at least a portion of the secret key value, K;
generating a fourth value by performing a logical operation between at least another portion of the random challenge word, RND, and at least another portion of the secret key value, K;
causing the LFSR circuitry to generate a third pseudorandom value from the third value;
causing the additional circuitry to be utilized as the second linear feedback shift register that generates a fourth pseudorandom value from the fourth value;
generating a second key value, K", from the third pseudorandom value and the fourth pseudorandom value by causing the LFSR circuitry and the additional circuitry to function together as the key generator; and
causing the additional circuitry to combine the second key value, K", with $(m_1 K'+m_2 K'^2+ \ldots +m_l K'^l)$, thereby generating a message authentication code, MAC:

$$MAC = K'' + m_1 K' + m_2 K'^2 + \ldots + m_l K'^l.$$

16. The method of claim 12, wherein the second mode of operation additionally comprises causing a product of multiplication to be stored into the shift register of the multipurpose logic circuitry.

17. The method of claim 12, comprising:
operating a shift register, denoted K'-register, to receive and store one or more signals supplied by the summation circuitry.

18. The method of claim 17, comprising:
loading a dual-base representation of a value 1 into the shift register of the LFSR circuitry; and
causing output signals of the K'-register to be supplied to the multipurpose logic circuitry for use as an operand during multiplication.

19. The method of claim 12, comprising:

copying a value from the shift register of the multipurpose logic circuitry into the shift register of the LFSR circuitry.

20. The method of claim 12, comprising:

causing the following operations to be performed concurrently:

the LFSR circuitry and the feedback circuitry of the multipurpose logic circuitry functioning together as a multiplier that generates a first product and storing the first product into the shift register of the multipurpose logic circuitry as the first product is generated; and the LFSR circuitry and supplemental feedback circuitry functioning together as a multiplier that generates a second product and storing the second product into a supplemental shift register as it is generated, wherein:

signals to be fed back through the supplemental feedback circuitry are output signals supplied by one or more stages of the shift register of the LFSR circuitry; and the supplemental feedback circuitry generates a feedback signal in accordance with a function specified by one or more of the control signals, and the feedback signal is made available to an input stage of the supplemental shift register.

21. The method of claim 20, comprising:

generating a sum by sequentially combining one or more signals supplied by the summation circuitry with a corresponding number of signals supplied by the supplemental shift register.

22. The method of claim 21, comprising:

supplying the sum to the supplemental feedback circuitry; and operating the supplemental feedback circuitry to supply the output signal of the adder to the supplemental shift register.

* * * * *

UNITED STATES PATENT AND TRADEMARK OFFICE
CERTIFICATE OF CORRECTION

PATENT NO. : 8,036,380 B2  
APPLICATION NO. : 11/611128  
DATED : October 11, 2011  
INVENTOR(S) : Gehrmann et al.

Page 1 of 1

It is certified that error appears in the above-identified patent and that said Letters Patent is hereby corrected as shown below:

In Column 7, Line 31, delete "FO," and insert -- F(), --, therefor.

In Column 10, Line 18, in Equation, delete "$\cdots + [x]_{n-1}\beta_{n-1}, [x]_i \epsilon GF(2)$," and insert -- $\cdots + [x]_{n-1}\beta_{n-1}, [x]_i \in GF(2)$ --, therefor.

Signed and Sealed this  
Fifteenth Day of May, 2012

David J. Kappos  
*Director of the United States Patent and Trademark Office*